UNITED STATES PATENT OFFICE.

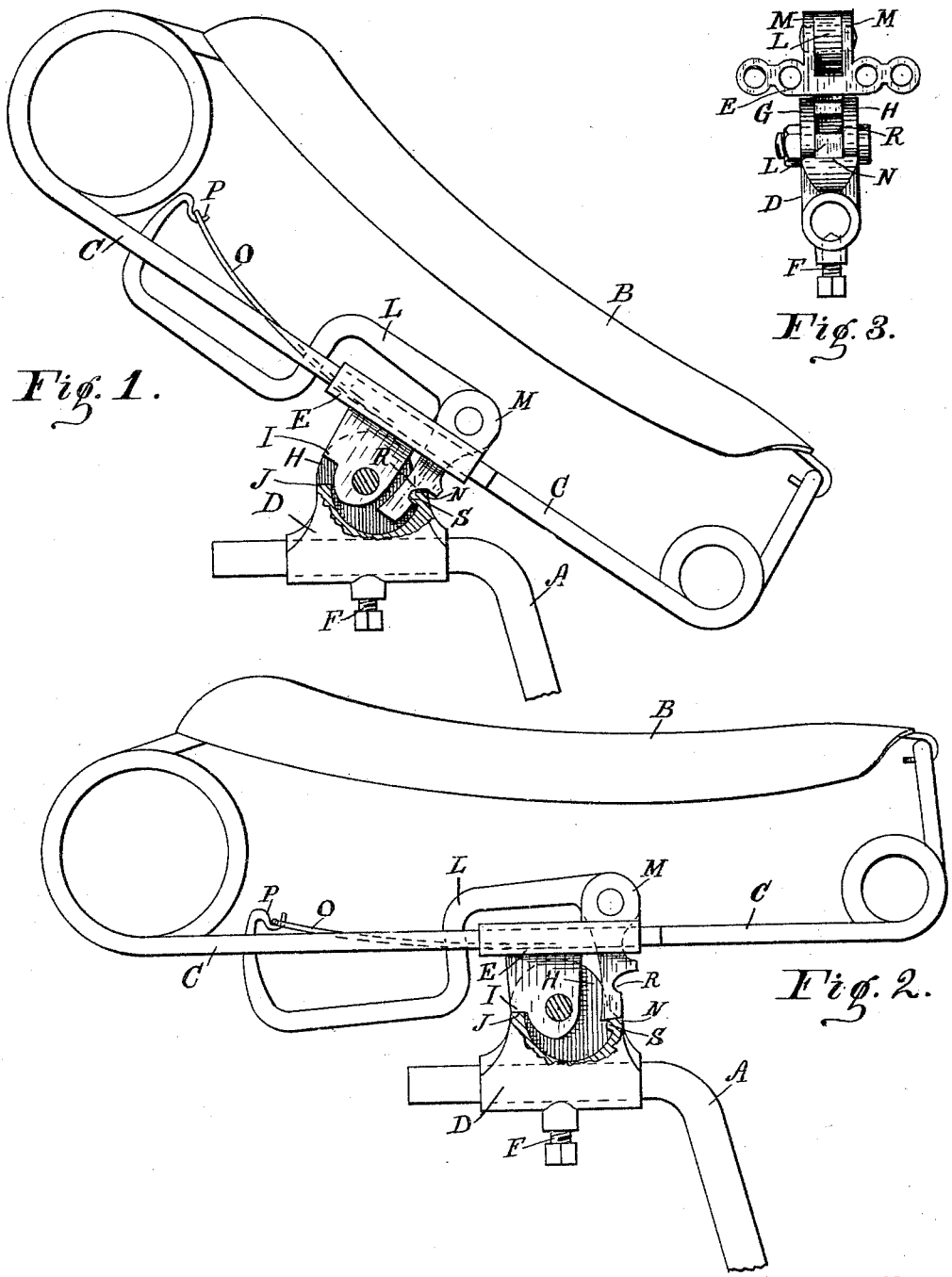

WILLIAM R. MERCER, OF TERRE HAUTE, INDIANA.

TILTING SEAT FOR BICYCLES.

SPECIFICATION forming part of Letters Patent No. 491,578, dated February 14, 1893.

Application filed July 8, 1892. Serial No. 439,381. (No model.)

*To all whom it may concern:*

Be it known that I, WILLIAM R. MERCER, a citizen of the United States, residing at Terre Haute, in the county of Vigo and State of Indiana, have invented a new and useful Improvement in Tilting Seats for Bicycles, of which the following is a specification.

My invention relates to an improvement in tilting seats for bicycles, for which Letters Patent No. 460,784 were issued to me October 6, 1891.

The objects of my present improvement are, to provide a more convenient and secure device for controlling the tilting of the seat, and to provide means for retaining the seat in its raised position, with a yielding force, so as to prevent its accidental displacement while the rider is mounting, all as hereinafter fully described.

The accompanying drawings illustrate my invention.

Figure 1 represents a side elevation of the bicycle-seat in its raised position ready for mounting; a portion of the lower member of the pivoted coupling, by which the seat is secured to the frame of the bicycle, being broken away so as to show the interior of the joint. Fig. 2 represents a like elevation showing the seat in position for riding. Fig. 3 represents an end elevation of the seat coupling.

In the drawings, A represents the seat-standard forming part of the bicycle frame.

B is the saddle or seat mounted on a spring support C which is connected with the seat-standard by means of a jointed coupling consisting of two parts D and E. The part D of the coupling is provided at its lower edge with a cylindrical socket adapted to receive the horizontal arm of the seat-standard, and is secured thereon by means of the set-screw F, its upper edge being provided with a pair of lugs G and H between which the upper section E is pivoted so as to swing thereon in a vertical plane. The upper member of the saddle-coupling is adapted to receive the springs C on which the saddle is mounted and is provided on that portion which is pivoted between the lugs G and H with a shoulder I, which, when the saddle is in the riding position engages a similar shoulder, J, on the lower member of the coupling and limits the backward movement of the saddle. Thus far the parts are substantially like those shown in my above mentioned Letters Patent. In said device the upper member of the coupling is locked, so as to hold the saddle in its riding position, by means of a dog pivoted to the lower member of the coupling at its forward end, and engaging a shoulder on the upper member of the coupling. When said dog is released from the shoulder the saddle may be tilted forward but there is no provision for holding the saddle in its tilted position. The dog in this position is found in practice to be insecure and difficult of access. It is also found in practice that it is necessary to have the saddle held in its tilted position with a yielding force, so as to prevent its accidental displacement while the rider is mounting. For the purpose, therefore, of providing a locking device for the saddle both in its tilted and its riding positions, which shall also be convenient of access and secure, I provide the bent lever L which is pivoted to the upper member of the seat-coupling between a pair of lugs M, M, so as to swing in a vertical plane thereon, the long arm of said lever projecting backward and downward so as to project below the springs C on which the saddle is mounted and beneath the rear end of the saddle. The shorter arm of said lever projects downward through the upper member of the coupling and engages, with its lower end, a shoulder, N, formed on the lower member of the coupling, thus holding shoulders I and J in close contact and firmly supporting the saddle in its riding position. The short arm of lever L is forced outward by means of a spring O, projecting from the rear end of the upper member of the coupling and engaging with its free end a hook P formed on the long arm of the lever. For the purpose of locking the saddle in its tilted position with sufficient force to prevent its accidental displacement, but at the same time to allow the saddle to yield to the weight of the rider and to come automatically to its riding position, I provide, in the outer face of the short arm of lever L, a notch, R, which is adapted to engage a rounded projection S, formed on the interior of the lower member of the coupling below shoulder N, the arrangement being such that the upper portion of said notch rests firmly upon the shoulder N while its lower portion engages the projection S as shown in Fig. 1.

In operation, previous to mounting the bicycle, the long arm of lever L and the spring C are grasped by the hand of the operator, the lever being first raised, thus putting spring O in tension and disengaging the short arm of the lever from shoulder N, and at the same movement tilting the seat upward as shown in Fig. 1. The recoil of spring O forces the short arm of the lever outward and holds notch R in engagement with projection S with a yielding force, thus preventing any accidental displacement of the saddle, until the weight of the rider, coming upon the saddle, overcomes the pressure of the spring and brings the saddle into its riding position, where it is locked by the automatic engagement of the lower end of the short arm of the lever with shoulder N.

I claim as my invention.—

1. The combination in a tilting-seat for bicycles, of a seat-coupling consisting of two members pivoted together so as to turn one upon the other, one of the said members being adapted to be rigidly secured to the bicycle frame and the other member adapted to swing in a vertical plane upon the said fixed member, said fixed member of the coupling being provided with a pair of shoulders which limit the movement of the swinging member, a lever having a long and a short arm and pivoted to said swinging member of the coupling so as to swing in a vertical plane thereon, the long arm of said lever being arranged to project below the seat-support and the short arm of the lever arranged to engage one of the shoulders on the fixed member of the coupling, and a spring arranged to hold said lever normally in engagement with said shoulder all arranged to co-operate substantially as and for the purpose set forth.

2. In a tilting-seat for bicycles, the combination of the fixed member D of the seat-coupling, having shoulder N and interior projection S, the tilting member E, the lever L pivoted to said member E and provided with the notch R, and the spring O, all arranged to co-operate substantially as and for the purpose set forth.

WILLIAM R. MERCER.

Witnesses:
A. M. HOOD,
H. P. HOOD.